United States Patent
LeHoty et al.

(10) Patent No.: US 6,804,038 B1
(45) Date of Patent: Oct. 12, 2004

(54) BIPOLAR OPERATION OF LIGHT-MODULATING ARRAY

(75) Inventors: David A. LeHoty, Mountain View, CA (US); Bryan Staker, Pleasanton, CA (US)

(73) Assignee: Silicon Light Machines, Inc., Sunnyvale, CA (US)

( * ) Notice: Subject to any disclaimer, the term of this patent is extended or adjusted under 35 U.S.C. 154(b) by 67 days.

(21) Appl. No.: 10/183,579

(22) Filed: Jun. 26, 2002

(51) Int. Cl.$^7$ .......................... G02B 26/00; G02B 26/08
(52) U.S. Cl. ...................... 359/290; 359/291; 359/292; 359/212
(58) Field of Search ................... 359/290, 291, 359/292, 238, 226, 225, 224, 223, 197, 212, 578, 579, 230

(56) References Cited

U.S. PATENT DOCUMENTS

| | | | |
|---|---|---|---|
| 5,311,360 A | * | 5/1994 | Bloom et al. ............... 359/572 |
| 5,444,566 A | * | 8/1995 | Gale et al. ................... 359/291 |
| 6,215,579 B1 | | 4/2001 | Bloom et al. |
| 6,392,821 B1 | * | 5/2002 | Benner, Jr. .................. 359/727 |
| 6,407,851 B1 | * | 6/2002 | Islam et al. ................. 359/291 |

OTHER PUBLICATIONS

D.T. Amm, et al. "Grating Light Valve Technology: Update and Novel Applications" May 19, 1998, pp. 1–4, Silicon Light Machines. Presented at Society for Information Display Symposium, Anaheim, CA.

David T. Amm, et al. "Optical Performance of the Grating Light Valve Technology" 1999, pp. 1–8, Silicon Light Machines. Presented at Photonics West–Electronics Imaging.

R.W. Corrigan, "An Alternative Architecture for High Performance Display" Nov. 20, 1999, pp. 1–5, Silicon Light Machines. Presented at SMPTE Technical Conference and Exhibition. New York, NY.

R.W. Corrigan, et al. "Calibration of a Scanned Linear Grating Light Valve Projection System" May 18, 1999, pp. 1–4, Silicon Light Machines. Presented at Society for Information Display Symposium, San Jose, CA.

Robert Corrigan, et al. Silicon Light Machines—Grating Light Valve Technology Brief, Jun. 2001 ver C, pp. 1–8; Sunnyvale, California.

* cited by examiner

*Primary Examiner*—Tim Thompson
(74) *Attorney, Agent, or Firm*—Okamoto & Benedicto LLP

(57) ABSTRACT

One embodiment disclosed comprises a method for bipolar operation of a light-modulating array. The method includes driving light-modulating elements of the array in a first polarity, switching polarities from the first polarity to a second polarity, driving the light-modulating elements of the array in a second polarity, switching polarities from the second polarity to the first polarity, and repeating the steps. Another embodiment disclosed comprises an apparatus utilizing a light-modulating array. The apparatus includes a first look-up table storing data for operating elements the light-modulating array in a first polarity mode, and a second look-up table storing data for operating the elements of the light-modulating array in a second polarity mode. The apparatus also includes a drive system for driving the elements of the light-modulating array. The drive system is coupled to both the first and second look-up tables.

20 Claims, 9 Drawing Sheets

| Element ID 802 | Desired Intensity 804 | Drive Voltage Level 806 |
|---|---|---|
| 1 | 0 | 0 |
| 1 | 1 | 2.8 |
| 1 | 2 | 4.1 |
| ... | ... | ... |
| 1024 | 253 | 12.7 |
| 1024 | 254 | 13.5 |
| 1024 | 255 | 13.8 |

| Element ID 802 | Desired Intensity 804 | Drive Voltage Level 806 |
|---|---|---|
| 1 | 0 | 0 |
| 1 | 1 | -2.9 |
| 1 | 2 | -4.0 |
| ... | ... | ... |
| 1024 | 253 | -12.4 |
| 1024 | 254 | -12.8 |
| 1024 | 255 | -13.1 |

FIG. 8B  850

BIPOLAR OPERATION OF LIGHT-MODULATING ARRAY

BACKGROUND OF THE INVENTION

1. Field of the Invention

The present invention relates generally optical systems. The present invention relates more particularly to optical systems used for projection displays or for communication systems.

2. Description of the Background Art

A two-dimensional projection image may be formed by using one or more linear arrays of light-modulating elements. The light-modulating elements may comprise, for example, GRATING LIGHT VALVE (GLV) elements. In such display systems, the linear array modulates an incident light beam to display pixels along a column (or, alternatively, a row) of the two-dimensional (2D) image. A scanning system is used to move the column across the screen such that each light-modulating element is able to generate a row of the 2D image. In this way, the entire 2D image is displayed.

Arrays of light-modulating elements may also be applied to communications systems. For example, the arrays may be used as an optical micro-electromechanical system (MEMS) for use in optical networks.

Publications describing GLV devices and their applications include: "The Grating Light Valve: Revolutionizing Display Technology," by D. M. Bloom, Projection Displays III Symposium, SPIE Proceedings, Volume 3013, San Jose, Calif., February 1997;

"Grating Light Valve Technology: Update and Novel Applications," by D. T. Amm and R. W. Corrigan of Silicon Light Machines in Sunnyvale, Calif., a paper presented at the Society for Information Display Symposium, May 19, 1998, Anaheim, Calif.;

"Optical Performance of the Grating Light Valve Technology," David T. Amm and Robert W. Corrigan of Silicon Light Machines, a paper presented at Photonics West-Electronics Imaging, 1999; "Calibration of a Scanned Linear Grating Light Valve Projection System," R. W. Corrigan, D. T. Amm, P. A. Alioshin, B. Staker, D. A. LeHoty, K. P. Gross, and B. R. Lang, a paper presented at the Society for Information Display Symposium, May 18, 1999, San Jose, Calif.; "An Alternative Architecture for High Performance Display," R. W. Corrigan, B. R. Lang, D. A. LeHoty, and P. A. Alioshin of Silicon Light Machines, a paper presented at the 141st SMPTE Technical Conference and Exhibition, Nov. 20, 1999, New York, N.Y.; "Breakthrough MEMS Component Technology for Optical Networks," Robert Corrigan, Randy Cook, and Olivier Favotte, Silicon Light Machines—Grating Light Valve Technology Brief, 2001; and U.S. Pat. No. 6,215,579, entitled "Method and Apparatus for Modulating an Incident Light Beam for Forming a Two-Dimensional Image," and assigned at issuance to Silicon Light Machines. Each of the above-mentioned publications is hereby incorporated by reference in its entirety.

FIG. 1 is a diagram depicting the reflective and diffractive operational states of a GRATING LIGHT VALVE (GLV) element. The left side of the diagram depicts the reflective (dark) state, while the right side of the diagram depicts the diffractive (bright) state.

In the example illustrated in FIG. 1, the substrate may comprise a silicon substrate with oxide (for example, about 5000 angstroms thick) overlaying the silicon, and tungsten (for example, about 1000 angstroms thick) overlaying the oxide. The reflective members lie above the tungsten with an air space there between. For example, three pairs of reflective members (i.e. six members) are shown. The reflective members may, for example, comprise reflective ribbons comprising nitride (for example, about 1000 angstroms thick) with a reflective layer of aluminum (for example, about 500 angstroms thick) on the nitride. Incident light is beamed onto the reflective members. The incident light beam may be at a perpendicular angle to the plane of the substrate.

In the reflective or dark state (left side), all the reflective members are in the same plane, and the incident light is reflected from the surfaces of the members. This reflective state may be called the dark state because it may be used to produce a dark spot (dark pixel) in a projection display system. Such a dark pixel may be produced by blocking the light that is reflected back along the same path as the incident light.

In the diffractive or bright state (right side), alternate ones of the reflective members are deflected downward. This results in the diffraction of the incident light in a direction that is at an angle to the path of the incident light. This reflective state may be called the bright state because it may be used to produce a bright spot (bright pixel) in a projection display system. Such a bright pixel may be produced because the angularly reflected light is not blocked. As discussed further below, the optical response of the element depends on the amount of downward deflection of the alternate members.

FIG. 2 is an illustration depicting a GLV element comprising pairs of fixed and movable ribbons. As depicted in FIG. 2, the GLV element may include pairs of reflective ribbons, each pair having one fixed and one movable ribbon.

FIG. 3 is a diagram depicting deflections of reflective members for a GLV element in a diffractive state. The GLV element comprises a plurality of reflective members. The reflective members comprise alternating bias members 304 and active member 306. In the example illustrated, the GLV element includes three pairs of reflective members (i.e. six of them).

In the diffractive state, the reflective members are controllably arranged in an alternating configuration at two heights from a common electrode 308, where bias members 304 are at a first height and active (movable) members 306 are at a second height. The bias members 304 may be fixed ribbons. The active members 306 may be movable ribbons pulled down by application of a voltage. The voltage may be applied with respect to the common electrode 308. As illustrated in FIG. 3, the incident light beam 310 impinges upon the element at an angle perpendicular to the grating plane 308. Diffracted light 312 travels away from the element.

The difference between first and second heights may be defined as the deflection distance $\gamma$. The amount of the deflection $\gamma$ may be varied by application of different voltages to control the amount of incident light reflected from the element. When $\gamma$ is near zero, the element would be near a maximally reflective state. When $\gamma$ is near $\lambda/4$, where $\lambda$ is the wavelength of the incident light, the element would be near a maximally diffractive state.

FIG. 4 is a graph illustrating a non-linear electro-optic response for a GLV element. The graph shows intensity of light (in arbitrary units) versus voltage. The higher the voltage is, the larger is the displacement $\gamma$ of the element.

Depending on the voltage applied to the active members, the light intensity varies. For the most part, the higher the applied voltage, the higher the light intensity. (This relationship reverses for sufficiently high voltages where the light intensity reduces with higher voltages, and hence the downward slope of the graph at the far right.)

FIG. 5 is a top view depicting a projection display system 500 that utilizes a light-modulating array. The system 500 includes one or more light sources 502, one or more arrays of light-modulating elements 504, an optical scanner 506, and a screen 508. The figure is for explanatory purposes and is not necessarily accurate in scale or angles.

The light source 502 may comprise one or more laser light sources. Three laser light sources of different colors may be utilized for a color display system. The light) modulating array 504 may comprise an array of GLV elements (also called GLV "pixels") described above. Each light source 502 may illuminate a light-modulating array 504. Each element of an array 504 modulates the light incident on it to control the amount of light diffracted therefrom. The diffracted light from the elements of the array 504 is then directed to the optical scanner 506.

The optical scanner 506 is used to move the column (or row) of light across the screen 508. Various types of scanners 506 may be used. For example, galvonometer-based scanners, resonant scanners, polygon scanners, rotating prisms, or other types of scanners may be used. A drive signal is applied to the scanner to control ("drive") the movement of the column (or row) of light. For example, to achieve a progressive scan of the column across the screen (e.g., from left to right), a sawtooth drive signal may be used.

One disadvantageous aspect of using GLV and other MEMS technology relates to changes in device performance as a function of time. Whether used in a display or communication system, the response function of a GLV element and other MEMS devices has been observed to change over time. Such time-dependent changes can lead to unpredictable behavior and thus may limit the applications for GLV elements and other MEMS devices.

SUMMARY

One embodiment of the invention comprises a method for bipolar operation of a light-modulating array. The method includes driving light-modulating elements of the array in a first polarity, switching polarities from the first polarity to a second polarity, driving the light-modulating elements of the array in the second polarity, switching polarities from the second polarity to the first polarity, and repeating the steps.

Another embodiment of the invention comprises an apparatus utilizing a light-modulating array. The apparatus includes a first look-up table storing data for operating elements the light-modulating array in a first polarity mode, and a second look-up table storing data for operating the elements of the light-modulating array in a second polarity mode. The apparatus also includes a drive system for driving the elements of the light-modulating array. The drive system is coupled to both the first and second look-up tables.

These and other features of the present invention will be readily apparent to persons of ordinary skill in the art upon reading the entirety of this disclosure, which includes the accompanying drawings and claims.

BRIEF DESCRIPTION OF THE DRAWINGS

FIG. 8A is a diagram depicting a first look-up table of a first polarity in accordance with an embodiment of the invention.

FIG. 8B is a diagram depicting a second look-up table of a second polarity in accordance with an embodiment of the invention.

The use of the same reference label in different drawings indicates the same or like components. Drawings are not to scale unless otherwise noted.

DETAILED DESCRIPTION

One cause of the time-dependent performance of GLV technology relates to charge build-up in the light-modulating elements. As an element operates, electrical charge can build up on the nitride-based reflective members. This charge build-up disadvantageously results in changes in performance over time. The present invention provides a method and apparatus for overcoming such disadvantageous charge build-up. The invention is particularly applicable to GLV elements, but it may also be applicable to other MEMS devices. The invention may result in less time-dependent behavior of such devices and may be used in both display and communication systems.

Figure 6:
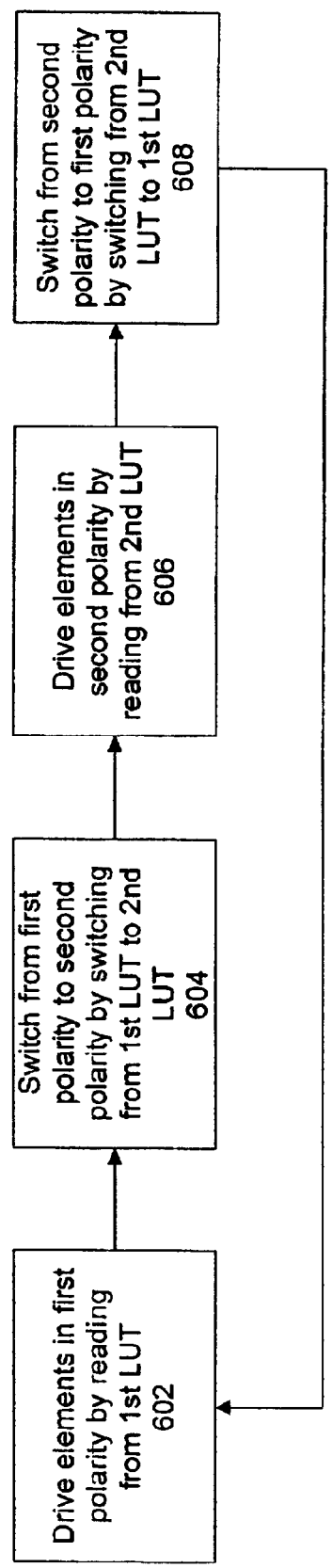
FIG. 6 is a flow chart depicting a method for bipolar operation of a light-modulating array in accordance with an embodiment of the invention.

FIG. 6 is a flow chart depicting a method 600 for bipolar operation of a light-modulating array in accordance with an embodiment of the invention. As depicted, the method 600 includes four steps (602, 604, 606, and 608).

In the first step 602, elements of the array are driven in a first polarity. The first polarity refers to an applied electric potential where the voltages driving the active elements are generally more positive than the voltage at the bias element and the common electrode. The first polarity may correspond, for example, to positive voltages being applied to the active element while the bias element and the common electrode are held at ground (zero volts). As another example, the first polarity may correspond to less negative voltages being applied to the active element while the bias element and the common electrode are held at a more negative voltage level.

For each element, the voltage to be applied to attain a desired intensity level may be determined by using a first look-up table (LUT). An example of such a first LUT is described below in relation to FIG. 8A.

In the second step 604; the apparatus switches from operating in a first polarity mode to operating in a second polarity mode. The switch in polarity may be accomplished by switching from using the first LUT to using a second LUT.

In the third step 606, elements of the array are driven in the second polarity. The second polarity refers to an applied electric potential where the voltages driving the active elements are generally more negative than the voltage at the bias element and the common electrode. The second polarity may correspond, for example, to negative voltages being applied to the active element while the bias element and the common electrode are held at ground (zero volts). As another example, the second polarity may correspond to less positive voltages being applied to the active element while the bias element and the common electrode are held at a more positive voltage level.

For each element, the voltage to be applied to attain a desired intensity level may be determined by using a second look-up table (LUT). An example of such a second LUT is described below in relation to FIG. 8B.

In the fourth step 608, the apparatus switches from operating in the second polarity mode back to operating in the first polarity mode. This switch in polarity may be accomplished by switching from using the second LUT to using the first LUT.

By switching polarities as described above, the electric fields in the elements of the array are reversed. The reversal of electric fields advantageously reduces the charge build-up on the elements as the charges tend to cancel out over time.

Figure 7:
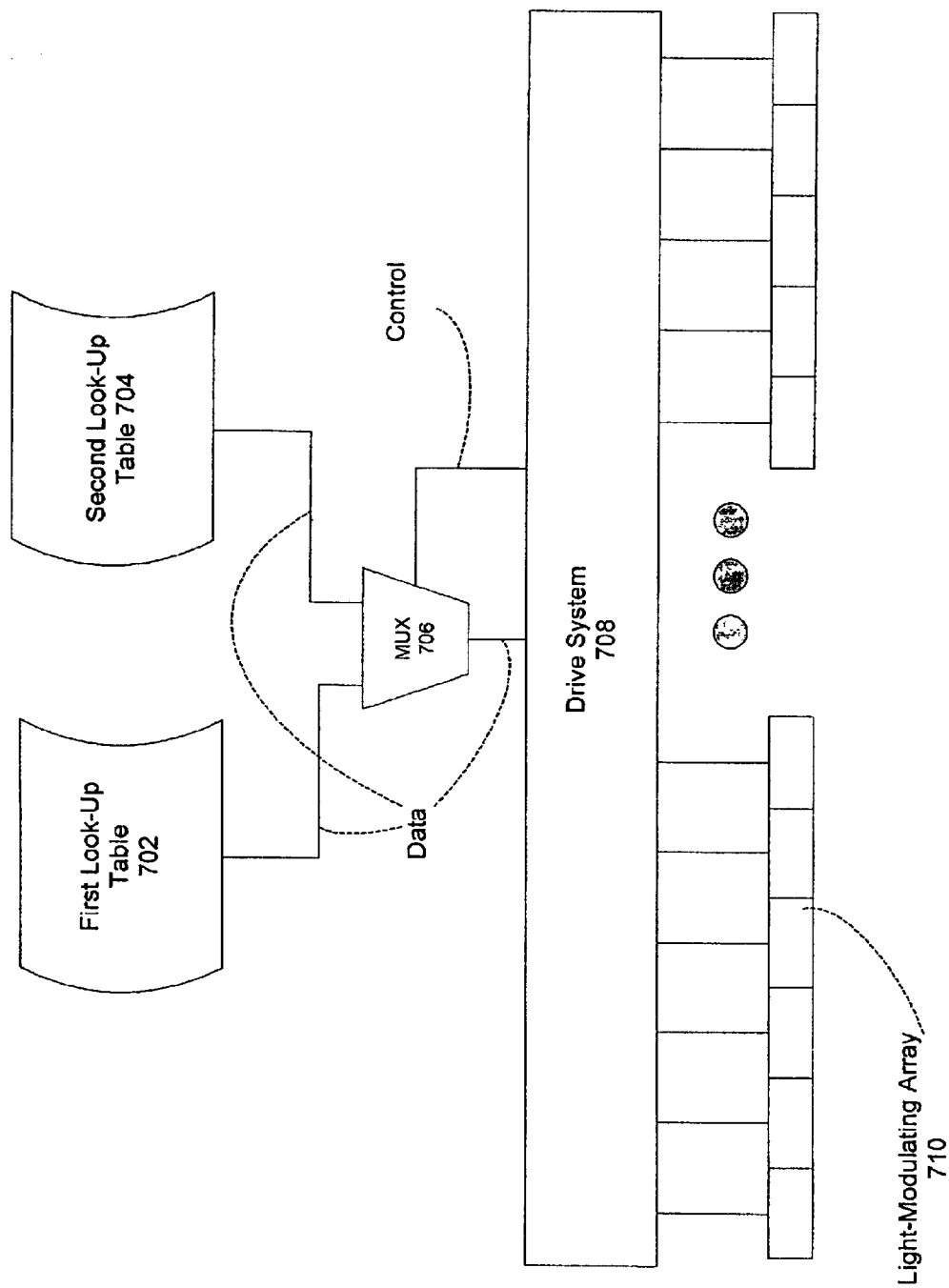
FIG. 7 is a diagram depicting an apparatus for bipolar operation of a light-modulating array in accordance with an embodiment of the invention.

FIG. 7 is a diagram depicting an apparatus 700 for bipolar operation of a light-modulating array in accordance with an embodiment of the invention. The apparatus 700 includes a first look-up table (LUT) 702, a second LUT 704, a multiplexor (MUX) 706, a drive system 708, and a light-modulating array 710.

The first LUT 702 provides data for use during operation in the first polarity mode, and the second LUT 704 provides data for use during operation in the second polarity mode. Examples of first and second LUTs are described below in relation to FIGS. 8A and 8B, respectively. The LUTs 702 and 704 may be implemented in a memory structure. In one embodiment, the LUTs would be implemented in a semiconductor memory that provides rapid access to the data stored therein.

The MUX 706 provides for selection of either the first LUT 702 or the second LUT 704. In the first polarity mode, the MUX 706 gives the drive system 708 access to data from the first LUT 702. In the second polarity mode, the MUX 706 gives the drive a system 708 access to data from the second LUT 704. In one embodiment, the MUX 706 may be controlled by a control signal from the drive system 708. The control signal may simply be a bit signal such that the first LUT 702 is selected when the bit is high and the second LUT 704 is selected when the bit is low (or vice-versa).

The drive system 708 looks up drive voltages corresponding to desired intensities for each element of the light-modulating array 710. The drive system 708 then applies the looked-up voltage to the appropriate element of the array 710 to achieve the desired intensity from that element.

In an alternative embodiment of the invention, both the first 702 and second 704 LUTs may be implemented as a combined LUT. Such a combined LUT would have data for both the first polarity mode and for the second polarity mode in a single table. Such a combined LUT would require a separate field to distinguish data for the first polarity mode from data for the second polarity mode.

FIG. 8A is a diagram depicting information in a first look-up table (LUT) 800 of a first polarity in accordance with an embodiment of the invention. The first LUT 800 includes three data fields: element identifier (ID) 802; desired intensity 804; and drive voltage level 806.

In this example, there are 1024 elements in the light-modulating array. Hence, the element IDs 802 depicted in FIG. 8A range from one (1) to one thousand twenty four (1024). Of course, various numbers of elements may be in the light-modulating array, and the number of element IDs 802 will vary accordingly.

The example shows the desired light intensity 804 ranging from 0 to 255. This corresponds to two hundred fifty six (256) intensity levels. Two hundred fifty six (256) different levels may be distinguished using eight (8) bits of information. Of course, various numbers of intensity levels may be available in different systems, and the number of desired intensities 804 will vary accordingly.

Figure 1:
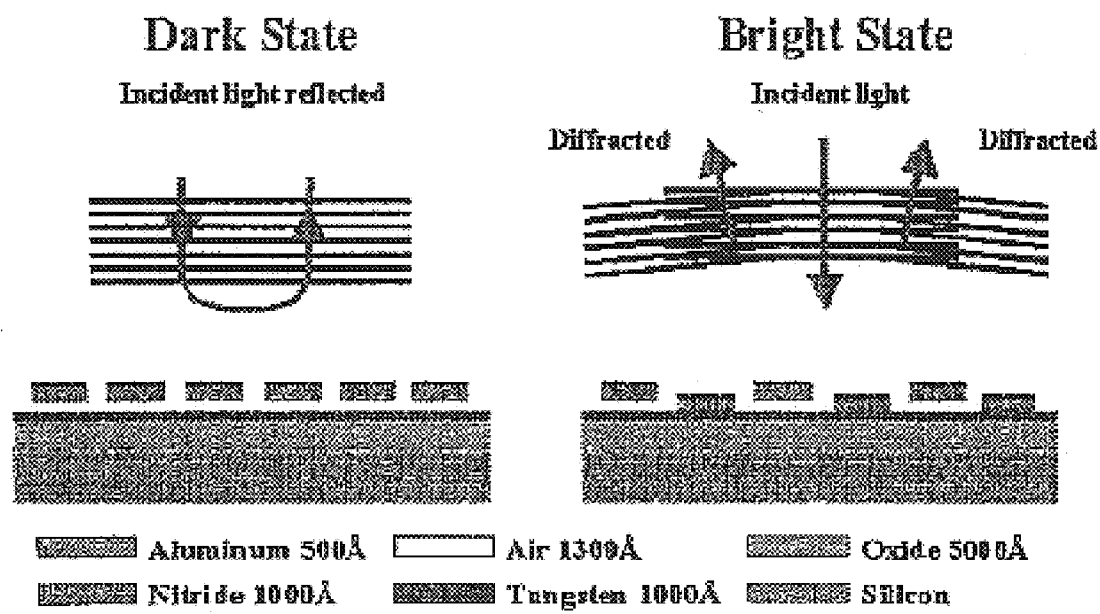
FIG. 1 is a diagram depicting the reflective and diffractive operational states of a conventional GRATING LIGHT VALVE (GLV) element.
Figure 2:
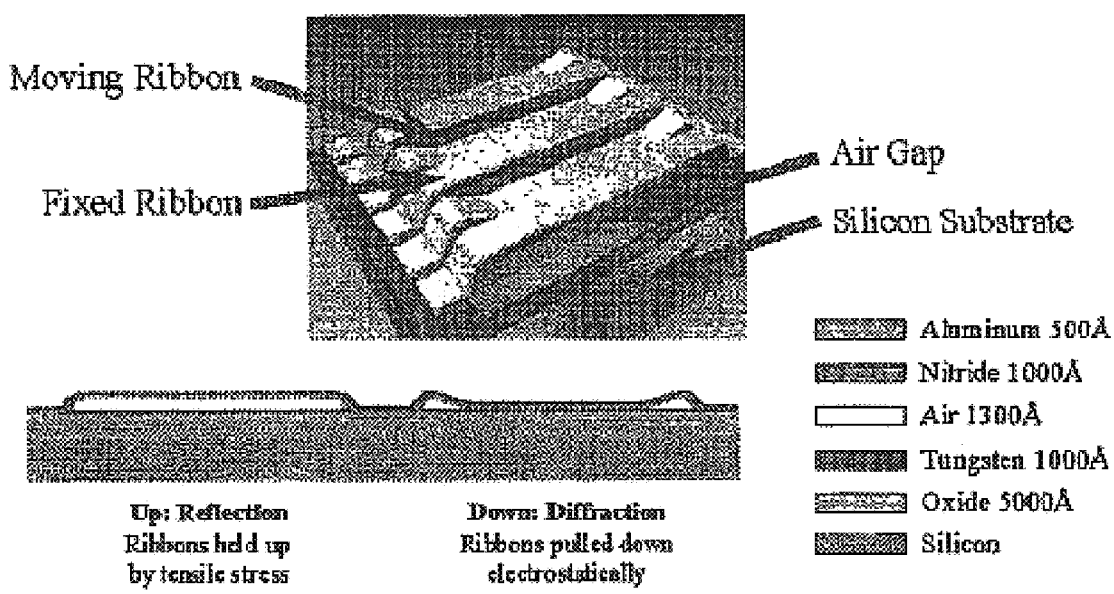
FIG. 2 is an illustration depicting a conventional GLV element comprising pairs of fixed and movable ribbons.
Figure 3:
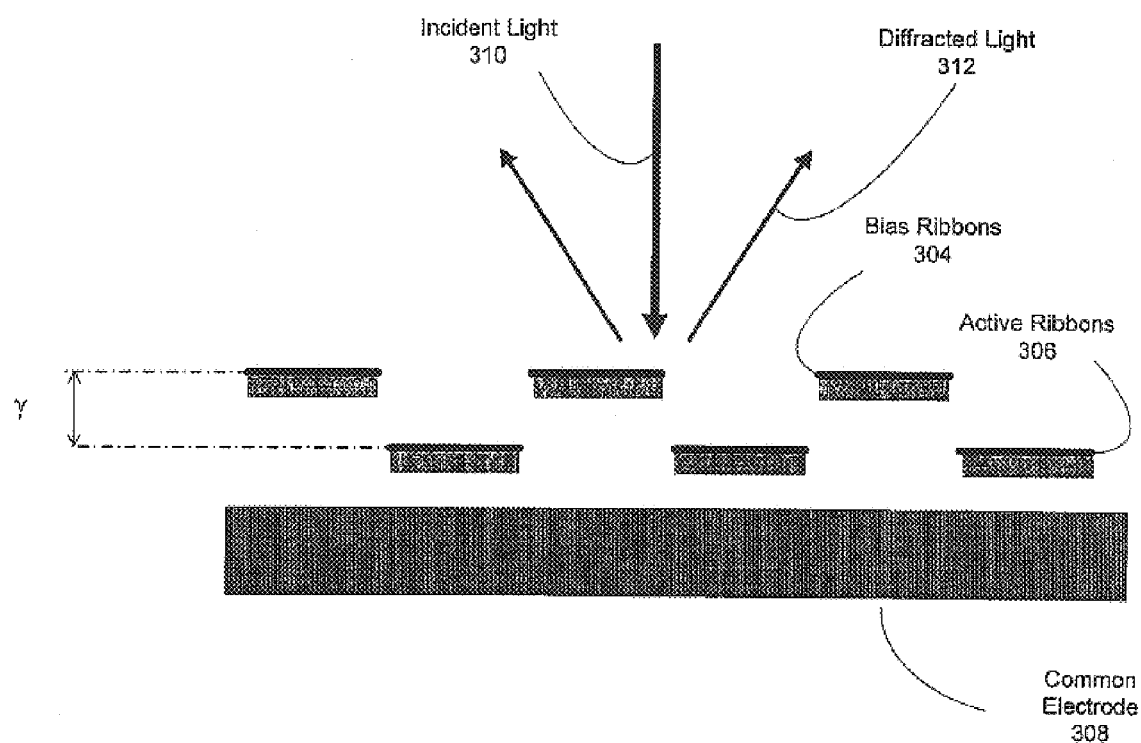
FIG. 3 is a diagram depicting deflections of reflective members for a conventional GLV element in reflective state.
Figure 4:
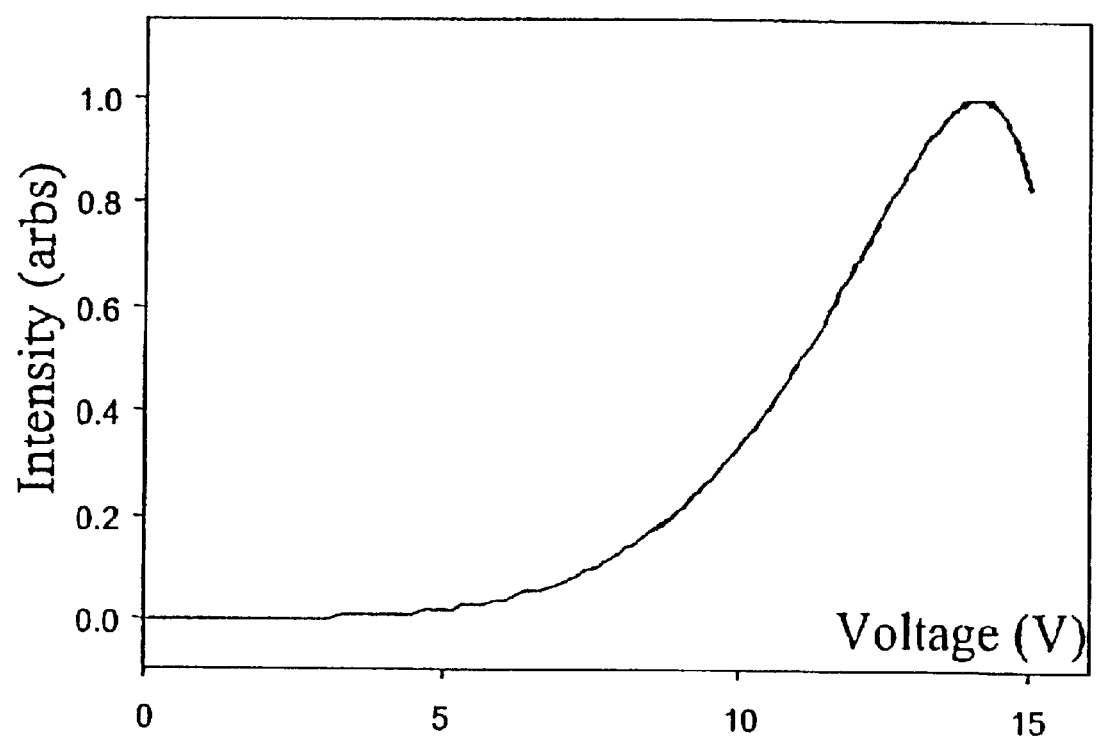
FIG. 4 is a graph illustrating a non-linear electro-optic response for a conventional GLV element.
Figure 5:
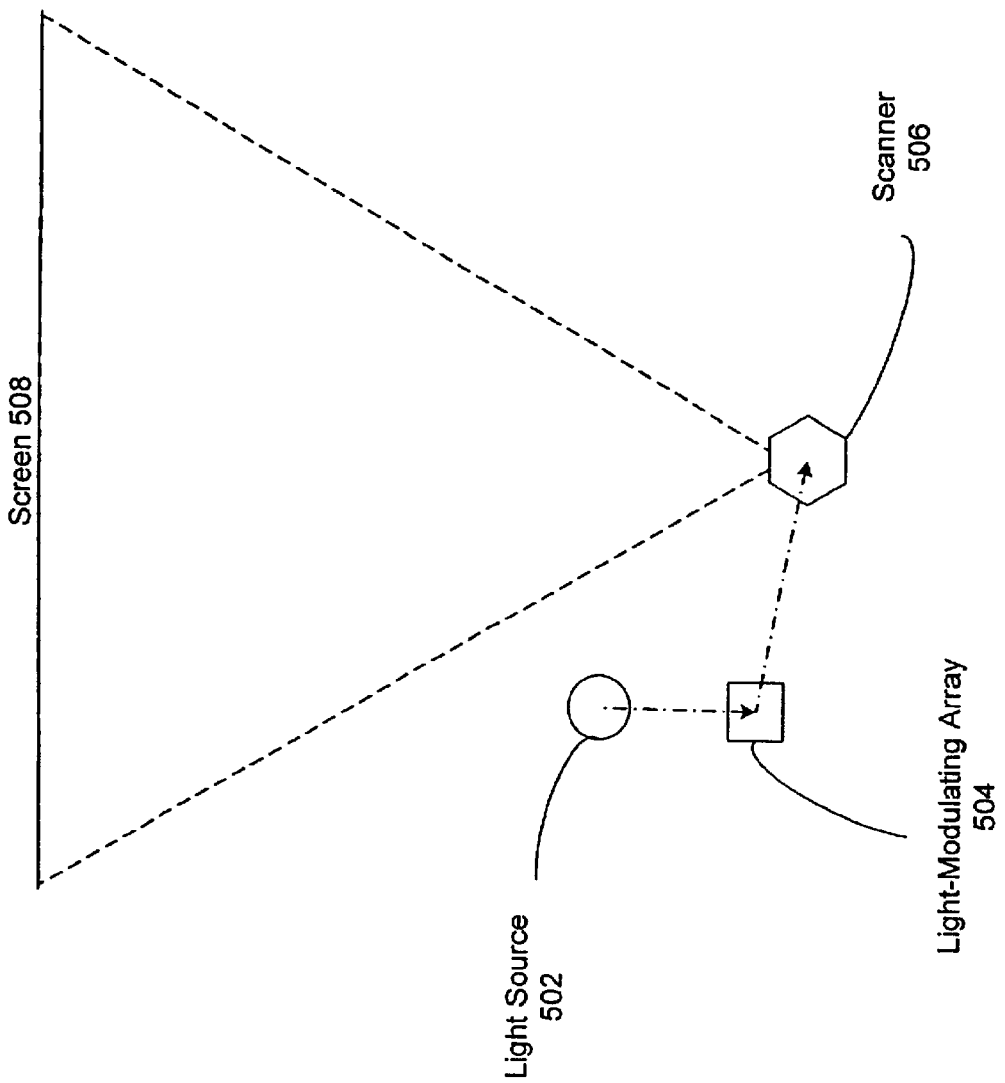
FIG. 5 is a top view depicting a projection display system utilizing a light-modulating array.

The values for the drive voltage levels 806 in FIG. BA shown are for purposes of illustration. The drive levels are shown as varying between about zero volts (0 V) to about positive fourteen volts (13.8 V in the figure). For elements that comprise GRATING LIGHT VALVE devices, larger voltage differences are needed at the lower intensities, and smaller voltage differences are needed at the higher intensities. This is seen from the intensity versus voltage curve in FIG. 4.

The drive voltage levels 806 in the first LUT 800 may be determined by a calibration procedure. The calibration procedure may be performed periodically. As a result of the calibration, the appropriate positive drive level 806 to achieve each desired iritensity 804 will be determined for each element 802 of the array. These calibration results are stored in the first LUT 800.

FIG. 8B is a diagram depicting information in a second look-up table 850 of a second polarity in accordance with an embodiment of the invention. The second LUT 850 includes the same three data fields (element ID 802; desired intensity 804; and drive voltage level 806) as the first LUT 800. Moreover, the data for the element IDs and for the desired intensity levels are the same in the second LUT 850 as in the first LUT 800. This is because the identification of the elements in the light-modulating array 710 does not change depending on the polarity mode, and the desired light intensities also do not change depending on the polarity mode.

However, the drive voltage levels 806 in the second LUT 850 do differ from those in the first LUT 800. The values for the drive voltage levels 806 in FIG. 8B shown are for purposes of illustration. The drive levels are shown as varying between about zero volts (0 V) to about negative thirteen volts (−13.1 V in the figure). In one embodiment, the second LUT 850 may actually store positive values that are converted to negative voltage levels when the system is in the second (negative) polarity mode.

The drive voltage levels 806 in the second LUT 850 may also be determined by periodic calibration. As a result of the calibration, the appropriate negative drive levels 806 to achieve each desired intensity 804 will be determined for each element 802 of the array. These calibration results are stored in the second LUT 850.

The following describes one particular implementation for the LUTs 800 and 850. In this implementation, the tables are combined to a single LUT such that the information for the first and second polarities are in different portions of the combined LUT. In this particular implementation, the number of elements may be 1088. Since 1088 is greater than 1024, eleven bits are needed to address each of the elements. This particular implementation may also specify 1024 different drive intensities using ten address bits. Hence the combined LUT uses twenty-one address bits per polarity to address the storage locations in the LUT. Each storage location may include a ten bits for output. In this particular implementation, the eight most significant of the ten output bits may be used to specify 256 different drive levels. The remaining two bits effectively interpolate between the drive levels by using dithering. In this case, each image frame may be refreshed four times. Hence, the two bits may be used to dither between a first level and a next level during the frame refreshes. For example, if the two bits are both zero, then the first level may be displayed four times. If the two bits are zero and one, then the first level may be displayed three times and the next level displayed one time. If the two bits are one and zero, then the first level may be displayed twice and the next level displayed twice. Finally, if the two bits are both one, then the first level may be displayed once and the next level displayed three times. Other particular implementations of the LUT addressing and output may, of course, be used.

In the present disclosure, numerous specific details are provided such as examples of apparatus, process parameters, materials, process steps, and structures to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

While specific embodiments of the present invention have been provided, it is to be understood that these embodiments are for Illustration purposes and not limiting. Many additional embodiments will be apparent to persons of ordinary skill In the art reading this disclosure. Thus, the present invention is limited only by the following claims.

What is claimed is:

1. A method for bipolar operation of a light-modulating array, the method comprising:
    driving light-modulating elements of the array in a first polarity;
    switching polarities from the first polarity to a second polarity while keeping substantially unchanged intensity levels from the light modulating elements;
    driving the light-modulating elements of the array in the second polarity; and
    switching polarities from the second polarity to the first polarity while keeping substantially unchanged intensity levels from the light modulating elements.

2. The method of claim 1, the method further comprising: repeating the preceding steps.

3. A method for bipolar operation of a light-modulating array, the method comprising:
    driving light-modulating elements of the array in a first polarity;
    switching polarities from the first polarity to a second polarity;
    driving the light-modulating elements of the array in the second polarity;
    switching polarities from the second polarity to the fist polarity; and
    repeating the preceding steps
    wherein driving the light-modulating elements in the first polarity comprises reading drive levels from a first look-up table of drive levels corresponding to light intensities, and wherein driving the light-modulating elements in the second polarity comprises reading drive levels from a second look-up table of drive levels corresponding to light intensities.

4. The method of claim 3, wherein switching polarities from the first polarity to the second polarity comprises switching from using the first look-up table to using the second look-up table, and wherein switching polarities from the second polarity to the first polarity comprises switching from using the second look-up table to using the first look-up table.

5. The method of claim 1, wherein charge build-up on the light-modulating elements is reduced by the bipolar operation of the light-modulating array.

6. The method of claim 1, wherein the light-modulating array comprises a micro electromechanical system (MEMS).

7. The method of claim 1, wherein elements of the light-modulating array comprise grating light valve type devices.

8. The method of claim 6, wherein the MEMS is used to switch optical signals in an optical network.

9. The method of claim 6, wherein the MEMS is used in a projection display system.

10. An apparatus for bipolar operation of a light-modulating array, the apparatus comprising:
    a first look-up table storing data for operating elements the light-modulating array in a first polarity mode;
    a second look-up table storing data for operating the elements of the light-modulating array in a second polarity mode; and
    a drive system for driving the elements of the light-modulating array,
    wherein the drive system is coupled to both the first and second look-up tables.

11. The apparatus of claim 10, wherein the drive system is configured to access data from the first look-up table in the first polarity mode and to access data from the second look-up table in the second polarity mode.

12. The apparatus of claim 11, wherein the drive system switches back and forth between the first polarity mode and the second polarity mode.

13. The apparatus of claim 10, wherein charge build-up on the light-modulating elements is reduced by the bipolar operation of the light-modulating array.

14. The apparatus of claim 10, wherein the light-modulating array comprises a micro electromechanical system (MEMS).

15. The apparatus of claim 10, wherein the elements of the light-modulating array comprise grating light valve type devices.

16. The apparatus of claim 14, wherein the MEMS is used to switch optical signals in an optical network.

17. The apparatus of claim 14, wherein the MEMS is used in a projection display system.

18. A system that utilizes light-modulating array, the system comprising:
    means for driving light-modulating elements of the array in a first polarity;
    means for switching polarities from the first polarity to a second polarity while keeping substantially unchanged intensity levels from the light modulating elements;
    means for driving the light-modulating elements of the array in the second polarity; and
    means for switching polarities from the second polarity to the first polarity while keeping substantially unchanged intensity levels from the light modulating elements.

19. The system of claim 18, the system further comprising:
    means for repeating the preceding steps.

20. A system that utilizes light-modulating array, the system comprising:
    means for driving light-modulating elements of the array in a first polarity;

means for switching polarities from the first polarity to a second polarity;

means for driving the light-modulating elements of the array in the second polarity; and means for switching polarities from the second polarity to the first polarity; and means for repeating the preceding steps, wherein driving the light-modulating elements in the first polarity comprises reading drive levels from a first look-up table of drive levels corresponding to light intensities, wherein driving the light-modulating elements in the second polarity comprises reading drive levels from a second look-up table of drive levels corresponding to light intensities, and wherein switching polarities from the first polarity to the second polarity comprises switching from using the first look-up table to using the second look-up table, and wherein switching polarities from the second polarity to the first polarity comprises switching from using the second look-up table to using the first look-up table.

\* \* \* \* \*

UNITED STATES PATENT AND TRADEMARK OFFICE
CERTIFICATE OF CORRECTION

PATENT NO. : 6,804,038 B1
DATED : October 12, 2004
INVENTOR(S) : LeHoty et al.

It is certified that error appears in the above-identified patent and that said Letters Patent is hereby corrected as shown below:

Column 7,
Line 55, after "polarity to the", replace "fist" with -- first --

Signed and Sealed this

Fifteenth Day of February, 2005

JON W. DUDAS
*Director of the United States Patent and Trademark Office*